(12) United States Patent
Hakushima et al.

(10) Patent No.: US 12,522,075 B2
(45) Date of Patent: Jan. 13, 2026

(54) POWER SUPPLY CONTROL DEVICE, POWER SUPPLY CONTROL METHOD, AND STORAGE MEDIUM

(71) Applicant: DENSO TEN Limited, Hyogo (JP)

(72) Inventors: Daiki Hakushima, Kobe (JP); Takeshi Matsumoto, Kobe (JP); Tomoyuki Kato, Kobe (JP)

(73) Assignee: DENSO TEN Limited, Kobe (JP)

( * ) Notice: Subject to any disclaimer, the term of this patent is extended or adjusted under 35 U.S.C. 154(b) by 195 days.

(21) Appl. No.: 18/436,534

(22) Filed: Feb. 8, 2024

(65) Prior Publication Data

US 2025/0001868 A1    Jan. 2, 2025

(30) Foreign Application Priority Data

Jun. 30, 2023  (JP) .................................. 2023-108840

(51) Int. Cl.
*B60L 3/00* (2019.01)

(52) U.S. Cl.
CPC .................. *B60L 3/0046* (2013.01)

(58) Field of Classification Search
CPC ................................. B60L 3/0046; B60L 3/00
USPC ......................................................... 701/34.4
See application file for complete search history.

(56) References Cited

U.S. PATENT DOCUMENTS

2019/0088960 A1 *  3/2019  Kwon ............... H01M 8/04559

FOREIGN PATENT DOCUMENTS

JP        2023-003696 A     1/2023

* cited by examiner

*Primary Examiner* — Shardul D Patel
(74) *Attorney, Agent, or Firm* — Oliff PLC

(57) ABSTRACT

A power supply control device includes: a controller configured to perform a diagnosis of a degree of deterioration of a backup power supply that supplies electric power to a load of a vehicle when a main power supply that supplies electric power to the load fails. The controller is configured to start the diagnosis before a user gets in the vehicle, when detecting an occurrence of an event indicating that the user is to get in the vehicle.

10 Claims, 12 Drawing Sheets

POWER SUPPLY CONTROL DEVICE, POWER SUPPLY CONTROL METHOD, AND STORAGE MEDIUM

CROSS-REFERENCE RELATED APPLICATIONS

This application is based on and claims priority under 35 USC 119 from Japanese Patent Application No. 2023-108840 filed on Jun. 30, 2023, the contents of which are incorporated herein by reference.

TECHNICAL FIELD

Embodiments disclosed herein relate to a power supply control device, a power supply control method, and a storage medium storing a power supply control program.

BACKGROUND

The related art discloses a power supply control device having a backup power supply for backup when a main power supply fails (for example, refer to Japanese Patent Application Laid-open Publication No. 2023-3696 (hereinafter, referred to as Patent Literature 1)).

Patent Literature 1 describes a diagnosis of whether the backup power supply used for autonomous driving of a vehicle functions correctly at the time of startup of the vehicle (when an IG is turned on).

Specifically, Patent Literature 1 describes that the backup power supply is discharged or charged at the time of startup to calculate an internal resistance of the backup power supply and determine a degree of deterioration, and autonomous driving is available if there is no problem in deterioration.

However, in the related art, there is a problem that convenience for a user may decrease due to the diagnosis of the backup power supply.

For example, in the technique described in Patent Literature 1, since it takes time to end the diagnosis after the vehicle is started, the user may not be able to start the movement by the autonomous driving immediately after the user gets in the vehicle.

A target to which electric power is supplied from the backup power supply is not limited to an autonomous driving system, and may be, for example, a steer-by-wire system in which a steering angle is controlled by a motor. For the vehicle on which the steer-by-wire system is mounted, it is desirable to prohibit traveling when the backup power supply does not function correctly. Therefore, the steer-by-wire system cannot be used and the vehicle cannot travel until the diagnosis of the backup power supply ends after the startup of the vehicle, and thus convenience for a user decreases.

The present disclosure has been made in view of the above, and an object thereof is to prevent a decrease in convenience for a user due to the diagnosis of the backup power supply.

SUMMARY

One aspect of the present disclosure relates to a power supply control device. The power supply control device includes: a controller configured to perform a diagnosis of a degree of deterioration of a backup power supply that supplies electric power to a load of a vehicle when a main power supply that supplies electric power to the load fails. The controller is configured to start the diagnosis before a user gets in the vehicle, when detecting an occurrence of an event indicating that the user is to get in the vehicle.

According to an aspect of the embodiment, a decrease in convenience for a user due to a diagnosis of a backup power supply can be prevented.

BRIEF DESCRIPTION OF DRAWINGS

Exemplary embodiments of the present disclosure will be described in detail based on the following figures, wherein.

DESCRIPTION OF EMBODIMENTS

Hereinafter, an embodiment of a power supply control device, a power supply control method, and a power supply control program will be described in detail with reference to the accompanying drawings. The present disclosure is not limited to the following embodiment. Hereinafter, a power supply control device that is mounted on a vehicle having an autonomous driving function and supplies electric power to a load will be described as an example, but the power supply control device according to the embodiment may be mounted on a vehicle not having an autonomous driving function.

Hereinafter, a case where the vehicle on which the power supply control device is mounted is an electric vehicle or a hybrid vehicle is described, and the vehicle on which the power supply control device is mounted may be an engine vehicle that travels by using an internal combustion engine.

The power supply control device according to the embodiment may be mounted on any device that includes a main power supply and a backup power supply (an auxiliary power supply) and backs up the main power supply with the backup power supply when a power supply failure occurs in the main power supply.

1. Configuration of Power Supply Control Device

Figure 1:
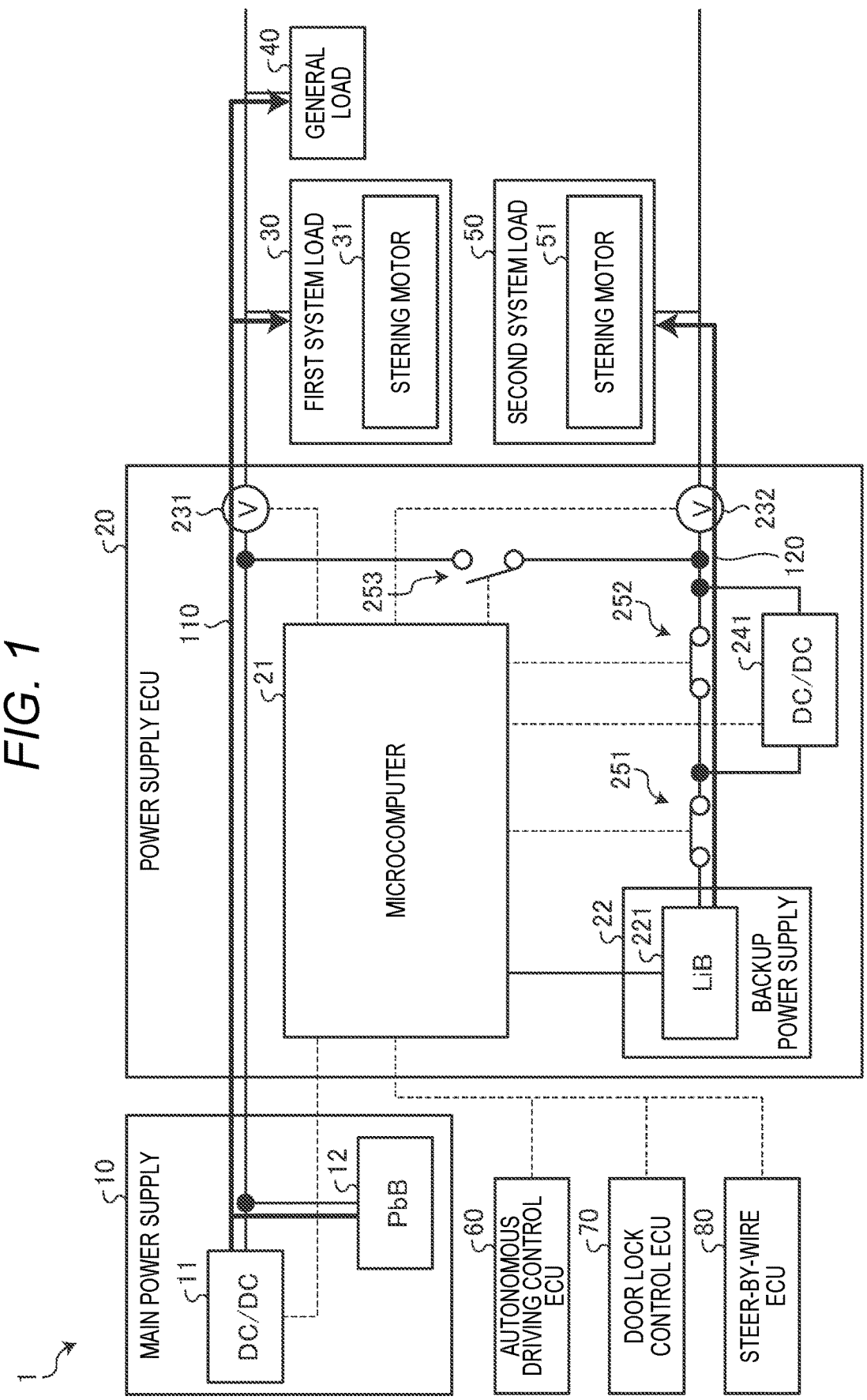
FIG. 1 is a diagram illustrating a configuration example of a power supply control device according to an embodiment.

FIG. 1 is a diagram illustrating a configuration example of the power supply control device according to the embodiment. A power supply electronic control unit (ECU) 20 is an example of the power supply control device. As illustrated in FIG. 1, the power supply ECU 20 according to the embodiment is connected to a main power supply 10, a first system load 30, a general load 40, a second system load 50, an autonomous driving control ECU 60, a door lock control ECU 70, and a steer-by-wire ECU 80. The power supply ECU 20 includes a first system 110 that supplies electric power from the main power supply 10 to the first system load 30 and the general load 40, and a second system 120 that supplies electric power from a backup power supply 22 described later to the second system load 50.

The first system load 30 includes one or more loads. The first system load 30 includes at least a steering motor 31 for realizing a steer-by-wire. In addition, the first system load 30 includes a load necessary for autonomous driving control, that is, a device that operates during autonomous driving, for example, an electric brake device, an in-vehicle camera, and a radar. The general load 40 is a load that is not directly related to the autonomous driving control, and includes, for example, a display, an air conditioner, audio, video, and various lights.

The second system load 50 has the same function as the first system load 30. The second system load 50 includes at least a steering motor 51 for realizing a steer-by-wire. In addition, the second system load 50 includes a load necessary for autonomous driving control of an electric brake device, an in-vehicle camera, a radar, or the like, that is, a device operating during autonomous driving. The first system load 30, the general load 40, and the second system load 50 operate with the electric power supplied from the power supply ECU 20.

The autonomous driving control ECU 60 is a device that executes an autonomous driving control of the vehicle by operating the first system load 30 or the second system load 50.

The door lock control ECU 70 is an ECU that executes control related to door lock of the vehicle. The door lock control ECU 70 performs communication with a key having a wireless communication function, and performs locking and unlocking of the door lock of the vehicle according to a signal received from the key. When the key is within a certain range from the vehicle, the vehicle can receive a radio signal output from the key. The door lock control ECU 70 unlocks and locks a door of the vehicle according to the radio signal received from the key. The key may be a dedicated device for performing a door lock operation of the vehicle, or may be an information processing terminal such as a smartphone having a radio wave transmission and reception function.

The steer-by-wire ECU 80 controls the steering motor 31 or the steering motor 51 according to a steering operation by the user. Accordingly, the steer-by-wire ECU 80 realizes the steer-by-wire.

The main power supply 10 includes a DC/DC converter (hereinafter, referred to as "DC/DC 11") and a lead battery (hereinafter, referred to as "PbB 12"). The battery of the main power supply 10 may be any secondary battery other than the PbB 12.

The DC/DC 11 is connected to a generator and a high-voltage battery having a voltage higher than that of the PbB 12, steps down a voltage of the generator and the high-voltage battery, and outputs the stepped-down voltage to the first system 110. The generator is, for example, an alternator that converts kinetic energy of a traveling vehicle into electricity and generates electric power. The high-voltage battery is, for example, a vehicle driving battery mounted on an electric vehicle or a hybrid vehicle.

When mounted on an engine vehicle, the main power supply 10 includes an alternator (a power generator) instead of the DC/DC 11. The DC/DC 11 charges the PbB 12, supplies electric power to the first system load 30 and the general load 40, supplies electric power to the second system load 50, and charges the backup power supply 22 to be described later.

The power supply ECU 20 includes the backup power supply 22, an inter-system switch 253, a battery switch 251, a bypass switch 252, a microcomputer 21, a first voltage sensor 231, a second voltage sensor 232, and a DC/DC 241. The backup power supply 22 is a backup power supply when the main power supply 10 cannot supply the electric power during autonomous driving. The backup power supply 22 supplies electric power to a load of the vehicle when the main power supply 10 that supplies electric power to the load fails. The backup power supply 22 includes a lithium-ion battery (hereinafter, referred to as "LiB 221"). A battery of the backup power supply 22 may be any secondary battery other than the LiB 221.

The inter-system switch 253 is provided in an inter-system line connecting the first system 110 and the second system 120, and is a switch capable of connecting and disconnecting the first system 110 and the second system 120. The battery switch 251 is a switch capable of connecting and disconnecting the LiB 221 to the second system 120. Specifically, the battery switch 251 is a switch capable of connecting and disconnecting the LiB 221, the bypass switch 252, and the DC/DC 241.

The bypass switch 252 is a switch capable of connecting and disconnecting the battery switch 251 and the second system 120. The DC/DC 241 is connected in parallel with the bypass switch 252, and adjusts a voltage output from the LiB 221 and a voltage input to the LiB 221.

The first voltage sensor 231 is provided in the first system 110, detects a voltage of the first system 110, and outputs a detection result to the microcomputer 21. The second voltage sensor 232 is provided in the second system 120, detects a voltage of the second system 120, and outputs a detection result to the microcomputer 21.

The microcomputer 21 includes a processor such as a central processing unit (CPU), and a memory such as a read only memory (ROM) and a random access memory (RAM). The microcomputer 21 may be implemented by hardware such as an application specific integrated circuit (ASIC) or a field programmable gate array (FPGA). The microcomputer 21 is an example of a controller.

The microcomputer 21 controls an operation of the power supply ECU 20 by the CPU executing a program stored in the ROM by using the RAM as a work area. The microcomputer 21 detects a ground fault in the first system 110 or the second system 120 based on detection results input from the first voltage sensor 231 and the second voltage sensor 232. A specific example of a method of detecting a ground fault by the microcomputer 21 will be described later.

When a ground fault in the first system 110 or the second system 120 is detected, the microcomputer 21 notifies each ECU of the detection. When a ground fault of the first system 110 or the second system 120 is detected, the microcomputer 21 may notify the autonomous driving control ECU 60 that the autonomous driving is not available. When a ground fault of the first system 110 or the second system 120 is not detected, the microcomputer 21 may notify the autonomous driving control ECU 60 that the autonomous driving is available.

When a ground fault of the first system 110 or the second system 120 is detected, the microcomputer 21 may notify the steer-by-wire ECU 80 that the steer-by-wire is not available. When a ground fault of the first system 110 or the second system 120 is not detected, the microcomputer 21 may notify the steer-by-wire ECU 80 that the steer-by-wire is available.

When a power supply failure such as a ground fault occurs in the first system 110, the microcomputer 21 disconnects the inter-system switch 253, conducts the battery switch 251 and the bypass switch 252, and supplies electric power from the backup power supply 22 to the second system load 50. When a power supply failure such as a ground fault occurs in the second system 120, the microcomputer 21 disconnects the inter-system switch 253 and supplies electric power from the main power supply 10 to the first system load 30 and the general load 40 in a state where the battery switch 251 is disconnected.

Accordingly, when a ground fault occurs in one of the systems during driving, the power supply ECU 20 may use the other system and cause the vehicle to retreat to a safe place and stop the vehicle by the autonomous driving control ECU 60.

The microcomputer 21 may discharge the backup power supply 22 to calculate an internal resistance (hereinafter referred to as "cell resistance") value of the backup power supply 22, and determine the deterioration of the cell resistance of the backup power supply 22 based on the cell resistance value.

The microcomputer 21 may charge the backup power supply 22 to calculate a capacity deterioration rate of the backup power supply 22 when a state of charge (SOC), which is a value indicating a charging state of the backup power supply 22, is lower than a recharge threshold, and determine the deterioration of the capacity of the backup power supply 22 based on the capacity deterioration rate.

The microcomputer 21 diagnoses whether the backup of the main power supply 10 by the backup power supply 22 is possible based on the determination result of the deterioration of the capacity of the backup power supply 22. As described above, the power supply ECU 20 can accurately diagnose whether the backup of the main power supply 10 by the backup power supply 22 is possible by considering the deterioration of the cell resistance of the backup power supply 22 and the deterioration of the capacity of the backup power supply 22. An operation example of the microcomputer 21 will be described later with reference to FIGS. 2 to 5 and FIGS. 8 to 9.

The microcomputer 21 stores information in an information storage device such as a data flash. The microcomputer 21 stores a cell resistance value map and a previous capacity deterioration rate. An example of the cell resistance value map will be described later with reference to FIG. 8. Next, an operation of the power supply ECU 20 will be described with reference to FIGS. 2 to 9.

2. Timing of Diagnosis of Backup Power Supply

First, a timing at which the backup power supply is diagnosed will be described. When detecting an occurrence of an event indicating that the user is to get in the vehicle, the microcomputer 21 starts a diagnosis before the user gets in the vehicle. Since the diagnosis is started before the user gets in the vehicle, the diagnosis ends, for example, until the vehicle is started (when the IG is turned on). Accordingly, the user can start the vehicle without waiting for the end of the diagnosis of the backup power supply 22. As a result, a decrease in convenience for a user due to the diagnosis of the backup power supply 22 is prevented.

The event may be referred to as an event. Further, the occurrence of an event indicating that the user is to get in the vehicle will be referred to as a trigger. That is, the microcomputer 21 detects a trigger. The microcomputer 21 may detect a trigger based on signals input from various ECUs such as the autonomous driving control ECU and the door lock control ECU 70. Further, the microcomputer 21 may detect a trigger when sensor values obtained from various sensors provided in the vehicle satisfy a condition. Hereinafter, a specific example of the trigger will be described.

As a trigger, the microcomputer 21 may detect that the user has approached within a certain range from the vehicle. For example, when a distance between the vehicle and a key for unlocking the door of the vehicle is less than a threshold, the microcomputer 21 detects that the user has approached the vehicle within a certain range.

For example, when receiving a radio signal output from the key, the door lock control ECU 70 transmits, to the microcomputer 21, a signal indicating that the key has approached within a certain range from the vehicle. When receiving the signal from the door lock control ECU 70, the microcomputer 21 determines that a user having the key is approaching the vehicle, and detects the trigger.

The user approaching the vehicle may consider performing operations, such as locking the door lock, getting in the vehicle after opening the door, and turning on the IG. If the diagnosis of the backup power supply 22 ends while the user is performing the operation, the user can start the vehicle without waiting.

When the microcomputer 21 detects that the door of the vehicle is unlocked, the microcomputer 21 may detect the trigger. In this case, the door lock control ECU 70 transmits a signal indicating that the door lock has been unlocked to the microcomputer 21. When receiving a signal from the door lock control ECU 70, the microcomputer 21 detects a trigger. Unlocking of the door may be performed according to a radio signal from a key, may be performed by the user operating a button or the like provided in the vehicle, or may be performed by the user inserting the key into a keyhole.

A case where the microcomputer 21 detects as a trigger that the door of the vehicle is unlocked is less likely influenced by the reception status of radio waves and the like as compared with a case where the microcomputer 21 detects as a trigger that the user has approached the vehicle within a certain range. Therefore, the microcomputer 21 can more reliably detect the trigger.

Furthermore, the microcomputer 21 may obtain a use reservation time of the vehicle by the user, and detect as a trigger that it is a time earlier than the use reservation time by a predetermined amount of time.

Here, it is assumed that the vehicle is used in a service such as carsharing and rental car. In this case, the vehicle is used by a user who has designated the use reservation time in advance. For example, the use reservation time is stored in a server or the like via a system for reservation.

The microcomputer 21 obtains the use reservation time from the server via a communication ECU provided in the vehicle. The microcomputer 21 may obtain the use reservation time from a manual input of an administrator.

The microcomputer 21 detects a trigger when it is a time earlier than the use reservation time by a predetermined amount of time (for example, five minutes before the use reservation time). As a result, the diagnosis ends at the use reservation time, and the user can start the vehicle without waiting. When the vehicle is provided with a control device that manages reservation for use of the vehicle, the microcomputer 21 may detect a trigger from the control device.

The microcomputer 21 may detect as a trigger that it is a time earlier by a predetermined amount of time than a prediction time at which the user starts driving the vehicle, and the prediction time is predicted based on a history of a time at which the user starts driving the vehicle.

The microcomputer 21 accumulates the time at which the IG is turned on as the history of the time at which the user starts driving. The microcomputer 21 predicts a time at which the IG is turned on next time based on a history of a certain period (for example, one week) in the past.

For example, the histories of the times at which the IG is turned on during one week include "8:03, 7:56, 8:08, 8:01, 8:00, 7:54, 8:01". In this case, since an average of the respective times is "8:00", the microcomputer 21 detects a trigger when the time is five minutes before "8:00", that is, "7:55". Accordingly, the diagnosis ends before "8:00", and if "8:00" or later, the user can start the vehicle without waiting.

The microcomputer 21 may detect a trigger when the time is five minutes before "7:54", that is, "7:49", which is the earliest time among the histories. Accordingly, it is possible to prevent the user more reliably from waiting. When there is a unique time greatly different from other times among the times when the IG is turned on during one week (for example, although most of the times are about 8:00, only one time is 12:00), the microcomputer 21 may predict a time when the IG is turned on next except for the unique time.

3. Normal Operation of Power Supply Control Device

Figure 2:
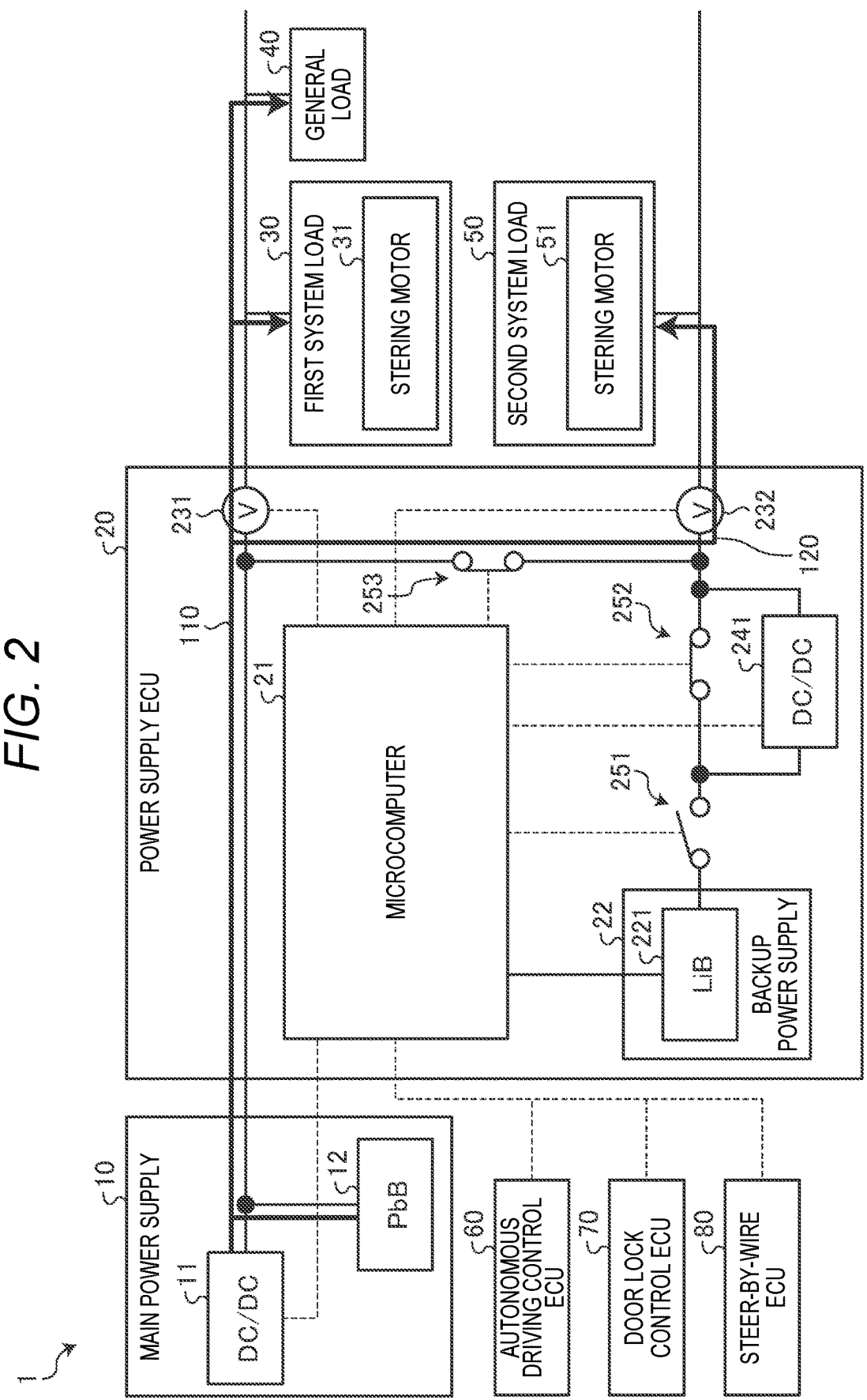
FIG. 2 is a diagram illustrating an operation example of the power supply control device according to the embodiment.

In a normal state where no ground fault occurs in the first system 110 and the second system 120, as illustrated in FIG. 2, the microcomputer 21 disconnects the battery switch 251, conducts the inter-system switch 253 in a state where the bypass switch 252 is conducted, and supplies electric power from the main power supply 10 to the first system load 30, the general load 40, and the second system load 50.

4. Operation of Power Supply Control Device at Time of Ground Fault

Figure 3:
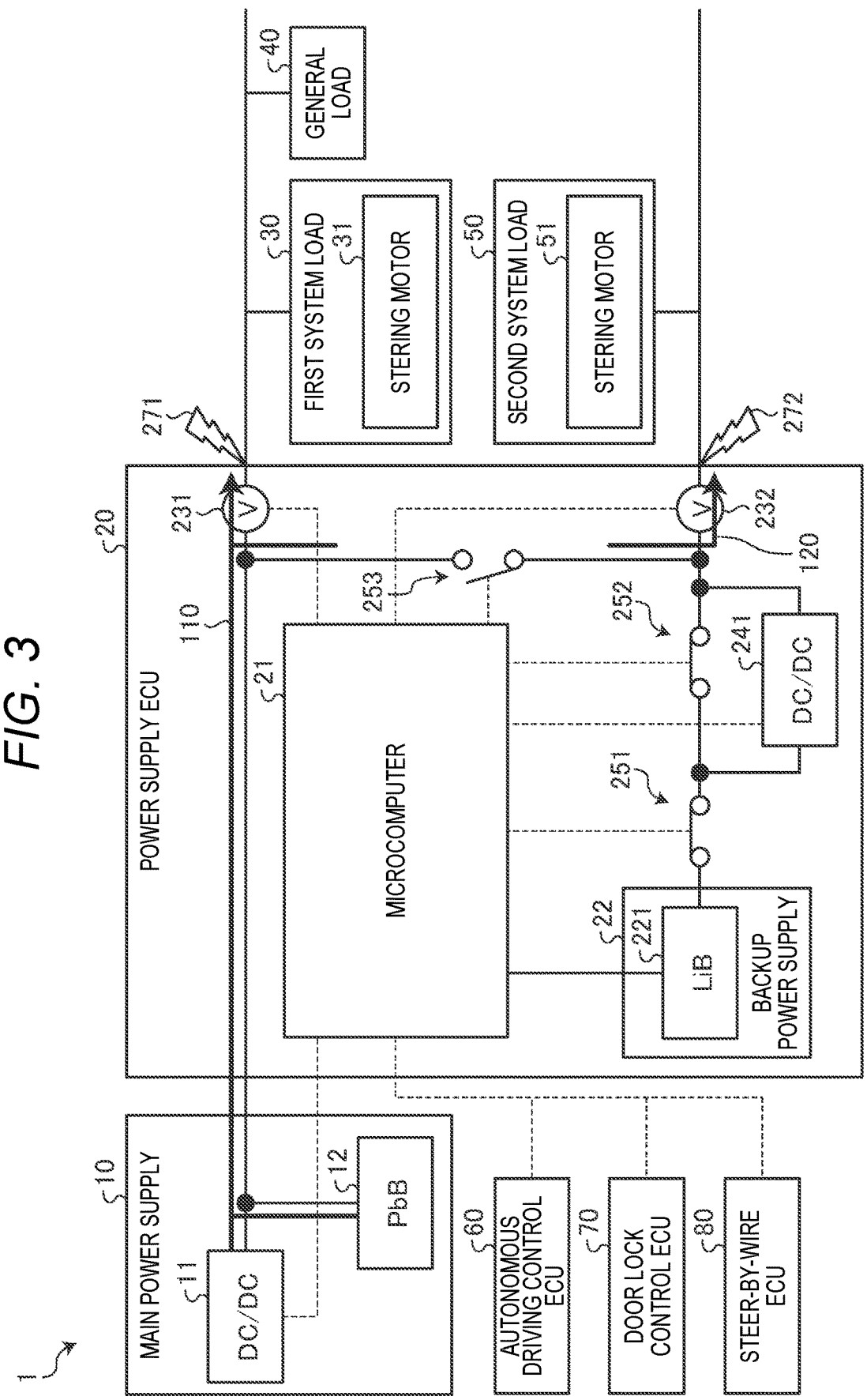
FIG. 3 is a diagram illustrating an operation example of the power supply control device according to the embodiment.

Next, an operation of the power supply ECU 20 at the time of a ground fault will be described with reference to FIGS. 3 to 5. As illustrated in FIG. 3, in the power supply ECU 20, for example, when a ground fault 271 occurs in the first system 110, an overcurrent flows toward a ground fault point, and thus the voltage of the first system 110 detected by the first voltage sensor 231 is equal to or smaller than a ground fault threshold.

In the power supply ECU 20, when a ground fault 272 occurs in the second system 120, an overcurrent flows toward a ground fault point, and thus the voltage of the second system 120 detected by the second voltage sensor 232 is equal to or smaller than the ground fault threshold.

For this reason, when the voltage detected by at least one of the first voltage sensor 231 and the second voltage sensor 232 is equal to or smaller than the ground fault threshold, the microcomputer 21 detects an abnormality of the power supply, disconnects the inter-system switch 253, and conducts the battery switch 251. At this time, the microcomputer 21 temporarily determines that a ground fault occurs in the first system 110 or the second system 120. Even when a ground fault occurs in either the first system 110 or the second system 120, the voltages detected by the first voltage sensor 231 and the second voltage sensor 232 show the same decreasing tendency. Therefore, the microcomputer 21 may compare the voltage detected by either the first voltage sensor 231 or the second voltage sensor 232 with the ground fault threshold to determine a ground fault.

By disconnecting the inter-system switch 253 and conducting the battery switch 251, the voltage of the system in which no ground fault occurs returns to a normal state, and the voltage of the system in which a ground fault occurs continues to decrease.

Therefore, thereafter, when the voltage detected by the first voltage sensor 231 is equal to or smaller than the ground fault threshold for a predetermined time period or more and the voltage detected by the second voltage sensor 232 returns to the voltage larger than the ground fault threshold within the predetermined time period, the microcomputer 21 performs main-determination that the ground fault 271 occurs in the first system 110.

Figure 4:
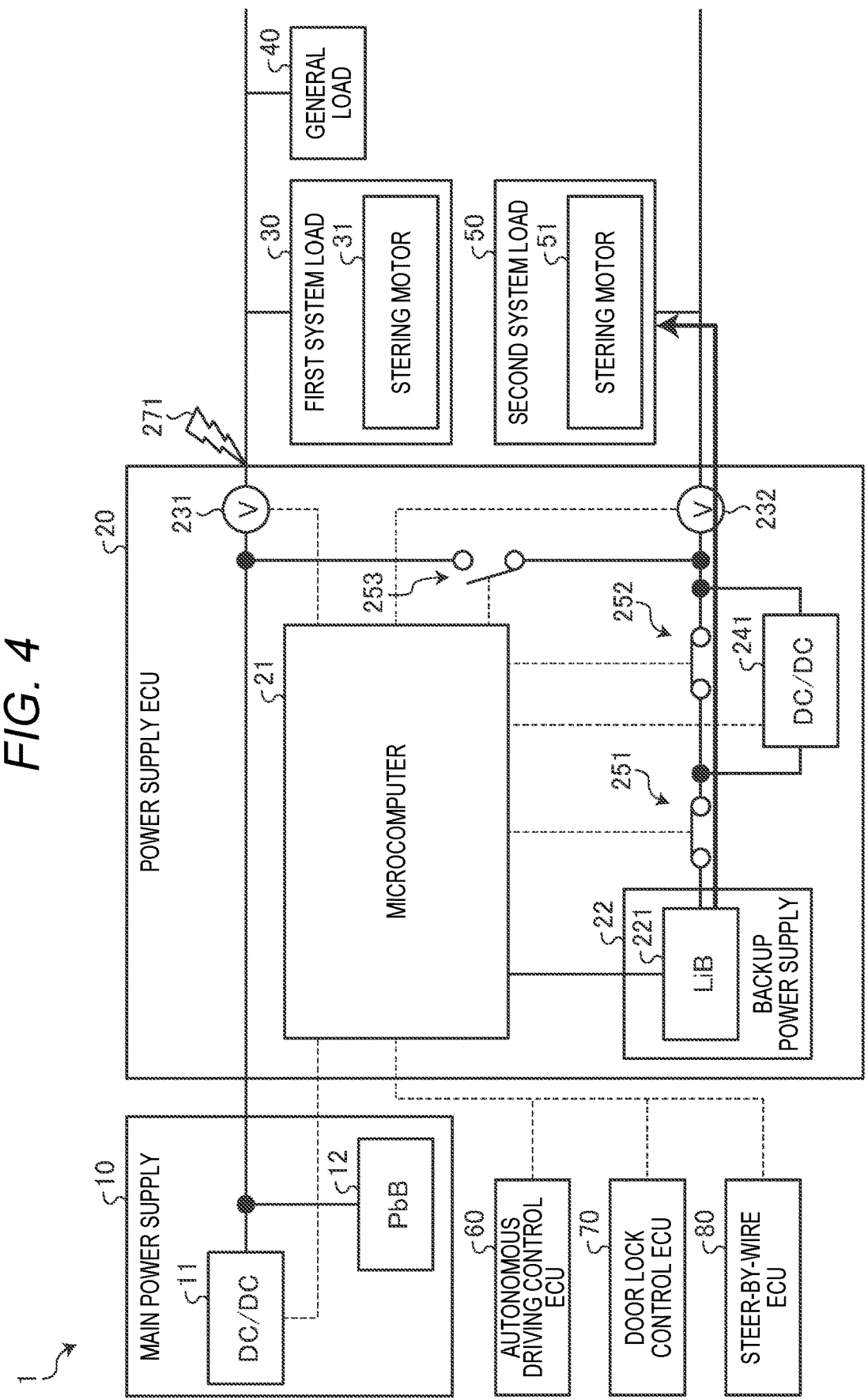
FIG. 4 is a diagram illustrating an operation example of the power supply control device according to the embodiment.

Then, as illustrated in FIG. 4, the microcomputer 21 supplies electric power from the backup power supply 22 to the second system load 50, and notifies the autonomous driving control ECU 60. Accordingly, the autonomous driving control ECU 60 can operate the second system load 50 with the electric power supplied from the backup power supply 22 to cause the vehicle to retreat to a safe place and stop.

After temporarily determining that a ground fault occurs in the first system 110 or the second system 120, when the voltage detected by the second voltage sensor 232 is equal to or smaller than the ground fault threshold and the voltage detected by the first voltage sensor 231 returns to the voltage larger than the ground fault threshold within a predetermined time period, the microcomputer 21 performs main-determination that the ground fault 272 occurs in the second system 120.

Figure 5:
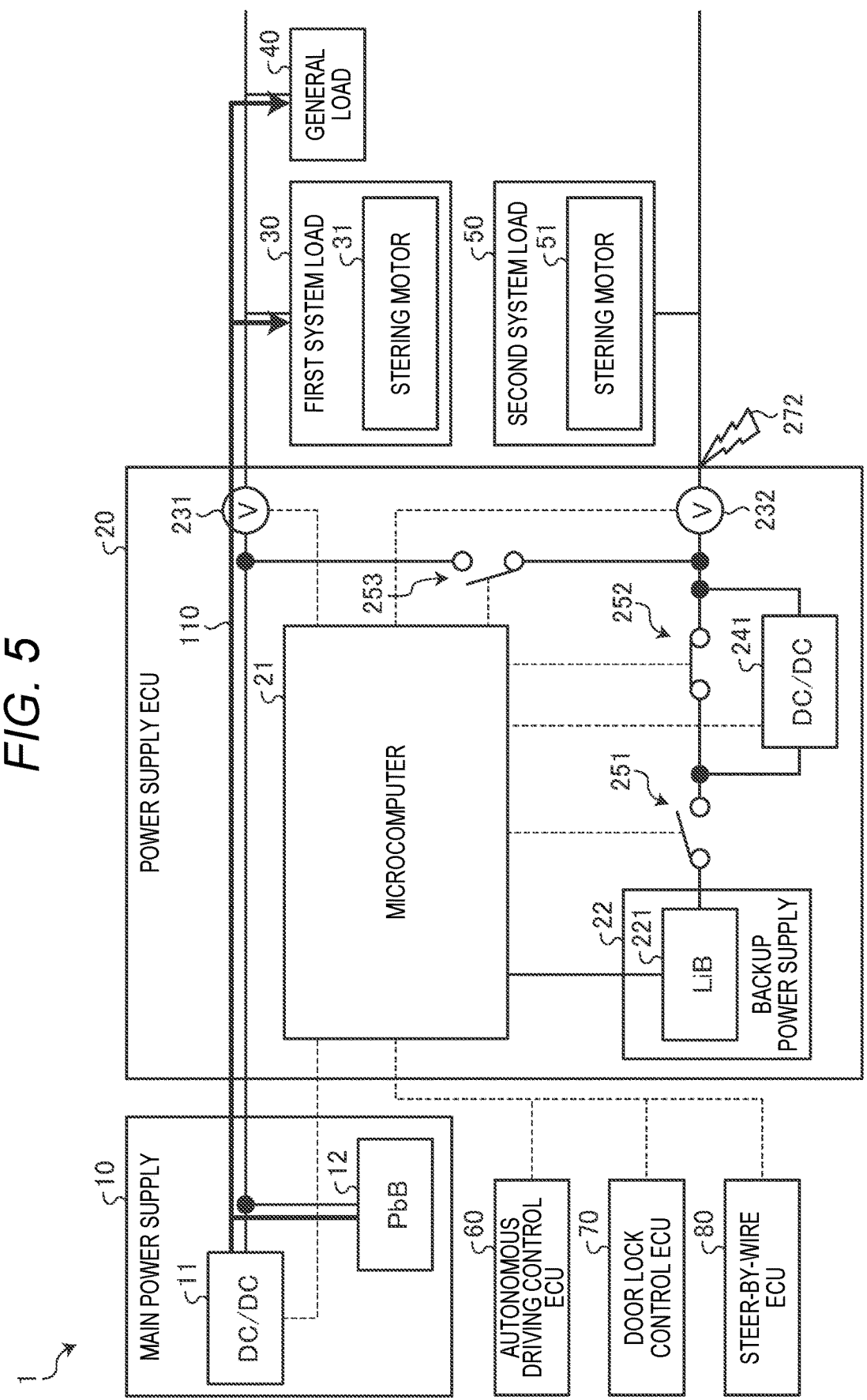
FIG. 5 is a diagram illustrating an operation example of the power supply control device according to the embodiment.

As illustrated in FIG. 5, the microcomputer 21 disconnects the battery switch 251, supplies electric power from the main power supply 10 to the first system load 30, and notifies the autonomous driving control ECU 60. Accordingly, the autonomous driving control ECU 60 can operate the first system load 30 with the electric power supplied from the main power supply 10 to cause the vehicle to retreat to a safe place and stop.

In the power supply ECU 20, when not the ground fault 271 or the ground fault 272 but the first system load 30, the general load 40, or the second system load 50 is temporarily in an overload state, the voltages detected by the first voltage sensor 231 and the second voltage sensor 232 may be temporarily equal to or smaller than the ground fault threshold.

In this case, in the power supply ECU 20, electric power is continuously supplied from the main power supply 10 to the first system load 30 and the general load 40, and electric power is supplied from the backup power supply 22 to the second system load 50. Therefore, when the voltages detected by the first voltage sensor 231 and the second voltage sensor 232 return to the voltage larger than the ground fault threshold before a predetermined time period elapses after the temporary determination that a ground fault occurs in the first system 110 or the second system 120, the microcomputer 21 performs main-determination that there is no abnormality in the power supply. Thereafter, in order to return to a normal operation illustrated in FIG. 2, the microcomputer 21 disconnects the battery switch 251 and re-conducts the inter-system switch 253. The microcomputer 21 may use a return threshold which is not the ground fault threshold but larger than the ground fault threshold as a threshold for recovery determination. Further, the microcomputer 21 may perform main-determination that there is no abnormality in the power supply when the voltage continuously exceeds the threshold for return determination for a predetermined time period or more.

5. Operation at Time of Diagnosis of Backup Power Supply

Next, a diagnosis operation for diagnosing whether the microcomputer 21 of the power supply ECU 20 is capable of backing up the main power supply 10 by the backup power supply 22 will be described with reference to FIGS. 6 to 9. Here, the backup power supply 22 can back up the main power supply 10 if the SOC exceeds a predetermined backup allowable lower limit.

However, when the deterioration progresses, the backup power supply 22 may not be able to back up the main power supply 10 because the amount of electric power that can be supplied decreases as compared with a normal state without deterioration even when the SOC exceeds the backup allowable lower limit. In order to accurately diagnose whether the backup is possible, it is necessary to consider the deterioration of the backup power supply 22.

One of methods for determining deterioration of the backup power supply 22 is a determination method based on the capacity deterioration rate. For example, the capacity deterioration rate may be calculated based on an increase rate of a charge amount in the backup power supply 22 at a time when the backup power supply 22 whose charge amount decreases is recharged. The capacity deterioration rate may also be calculated based on the SOC of the backup power supply 22 at a time when the backup power supply 22 whose charge amount decreases is charged until being fully charged.

Therefore, for example, when the backup power supply 22 is self-discharged and the SOC becomes less than the recharge threshold, the backup power supply 22 is recharged, and it is possible to diagnose whether the backup is possible in consideration of the capacity deterioration rate calculated based on the SOC and the increase rate of the charge amount at the time of recharging the backup power supply 22.

However, the backup power supply 22 may take several months until the SOC becomes less than the recharge threshold due to self-discharge. For this reason, for example, when a backup possibility diagnosis is performed based on the SOC every time at the time of startup, the diagnosis may be performed based on a capacity deterioration rate before the several months at a maximum, and accurate diagnosis of the backup may not be performed.

Figure 6:
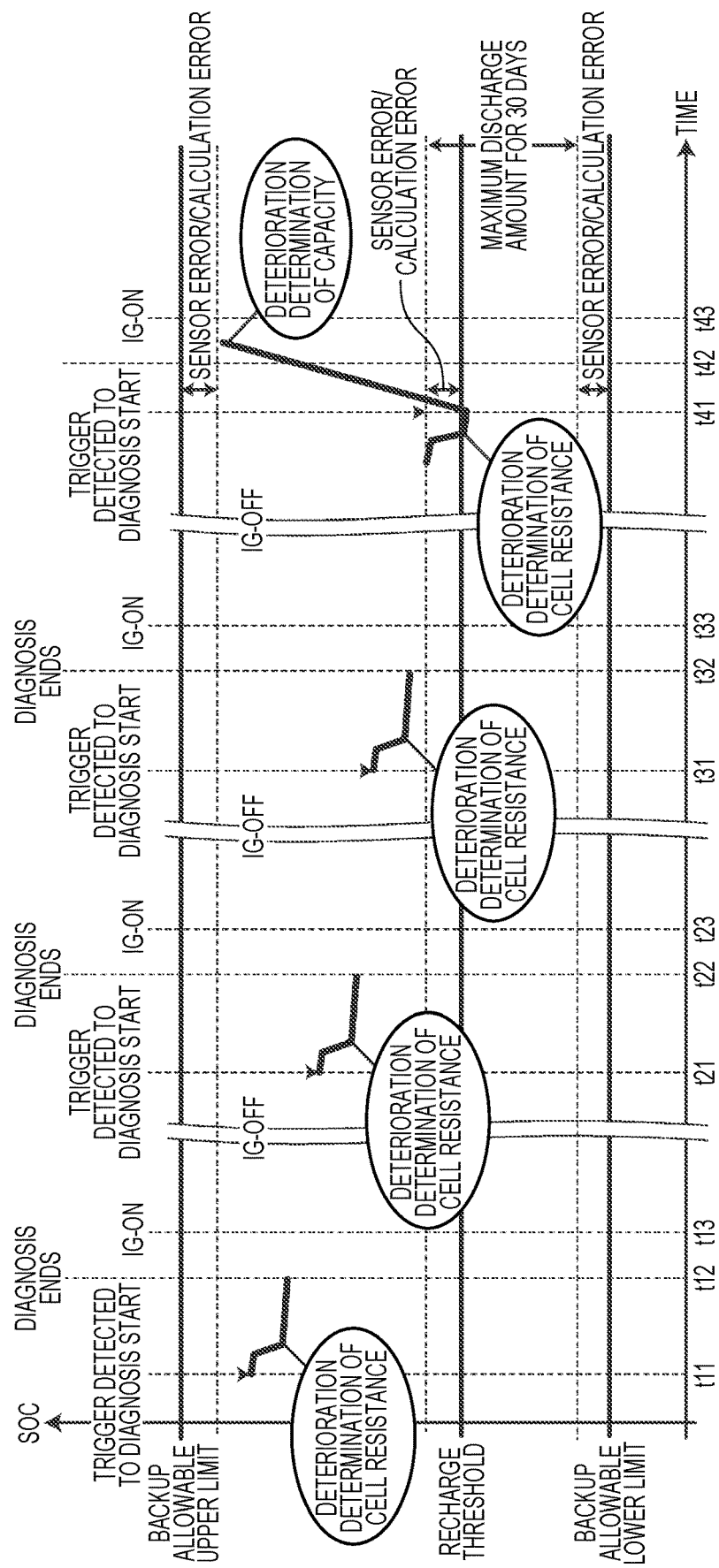
FIG. 6 is a timing chart illustrating timings of a diagnostic process according to the embodiment.

As illustrated in FIG. 6, the microcomputer 21 of the power supply ECU 20 according to the embodiment discharges the backup power supply 22 to calculate the cell resistance at a timing at which a trigger is detected.

When the microcomputer 21 determines that the cell resistance is not deteriorated according to the deterioration determination of the cell resistance, the capacity is not deteriorated based on the previously calculated capacity deterioration rate, and the SOC of the backup power supply 22 exceeds the recharge threshold, the microcomputer 21 diagnoses that the backup is possible.

In the present embodiment, it is assumed that the capacity deterioration rate of the backup power supply 22 in a new state is 100%, and a value of the capacity deterioration rate decreases as the deterioration of the capacity progresses. As described above, the microcomputer 21 can accurately diagnose whether the backup is possible by considering the deterioration of the cell resistance which is determined at the time of the detection of the trigger.

Thereafter, when the SOC of the backup power supply 22 is equal to or smaller than the recharge threshold, the microcomputer 21 charges the backup power supply 22 to calculate a current capacity deterioration rate. When the microcomputer 21 determines that the cell resistance is not deteriorated according to the deterioration determination of the cell resistance, the capacity is not deteriorated based on the currently calculated capacity deterioration rate, and the SOC of the backup power supply 22 exceeds the recharge threshold, the microcomputer 21 diagnoses that the backup is possible. As described above, the microcomputer 21 can accurately diagnose whether the backup is possible by considering the deterioration of the cell resistance determined at the time of the detection of the trigger and the latest capacity deterioration rate.

Specifically, when the trigger is detected, the microcomputer 21 first estimates the SOC of the backup power supply 22 and obtains a temperature from the backup power supply 22. The microcomputer 21 estimates an end of life (EOL) resistance value of the backup power supply 22 based on the SOC of the backup power supply 22, the temperature of the backup power supply 22, and the cell resistance value map.

The EOL resistance value is a value exceeding an upper limit of the cell resistance value at which the backup power supply 22 can perform backup, and is a cell resistance value of the backup power supply 22 that has reached a product life. That is, when the cell resistance value of the backup power supply 22 is less than the EOL resistance value, the backup power supply 22 is in a state in which the backup is possible in relation to the cell resistance.

As illustrated in FIG. 6, after the microcomputer 21 detects the trigger, it is possible to end the diagnosis of the backup power supply 22 until the IG is turned on. For example, the microcomputer 21 detects a trigger at a time t11 and starts a diagnosis. The microcomputer 21 ends the diagnosis at a time t12. Therefore, when the IG is turned on at a time t13 after the time t12, the diagnosis ends.

When the SOC of the backup power supply 22 is equal to or smaller than a threshold, the microcomputer 21 performs a diagnosis by charging the backup power supply 22. For example, at a time t41 in FIG. 6, since the SOC is equal to or smaller than the recharge threshold, the microcomputer 21 performs the diagnosis by charging the backup power supply 22. Accordingly, the microcomputer 21 can perform the diagnosis while charging the backup power supply 22. As a result, the efficiency of the entire process is improved.

However, when a diagnosis by charge is performed, it takes a longer time than when a diagnosis by discharge is performed. Therefore, after the trigger is detected, the diagnosis may not end before the IG is turned on by the user. For example, when the diagnosis by charge is started at a time t41 in FIG. 6, the diagnosis by charge does not end at a time t42 when it is considered that the diagnosis by discharge ends.

When the diagnosis by charge is performed, the microcomputer 21 notifies the user that it takes time until the vehicle is available according to the diagnosis. For example, the microcomputer 21 issues a notification by outputting an image or sound by a display, a speaker, or the like mounted on the vehicle, or by lighting a lamp indicating that the diagnosis is in progress.

Figure 7:
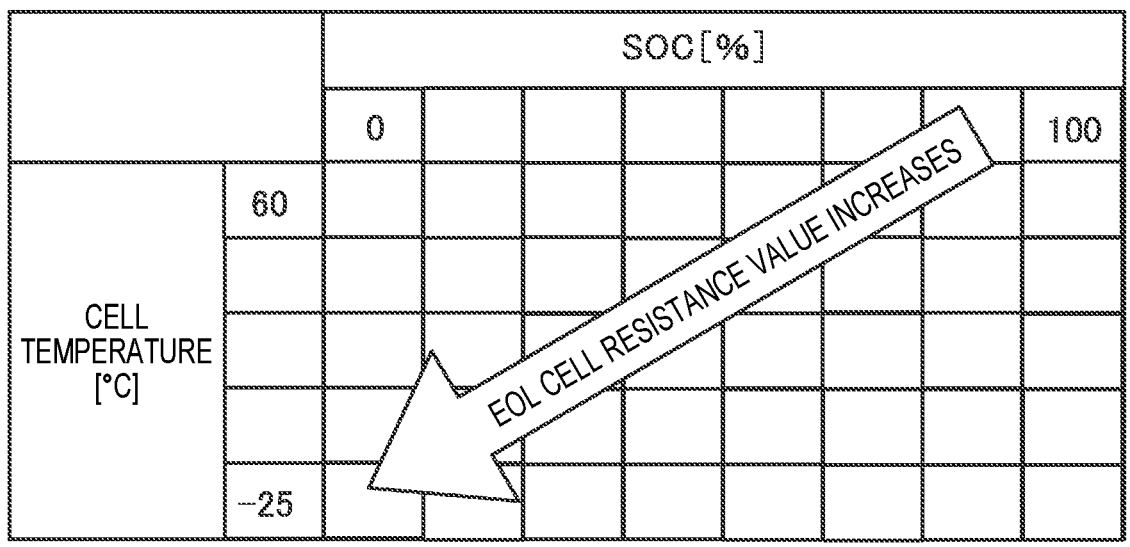
FIG. 7 is a diagram illustrating an example of a cell resistance value map according to the embodiment.

Here, an example of the cell resistance value map will be described with reference to FIG. 7. FIG. 7 is a diagram illustrating an example of the cell resistance value map according to the embodiment. As illustrated in FIG. 7, the cell resistance value map is a map showing the relation between the SOC and temperature of the backup power supply 22 and the EOL resistance value in this state. The microcomputer 21 obtains, from the cell resistance value map, an EOL cell resistance value corresponding to the estimated SOC of the backup power supply 22 and the obtained temperature.

Figure 8:
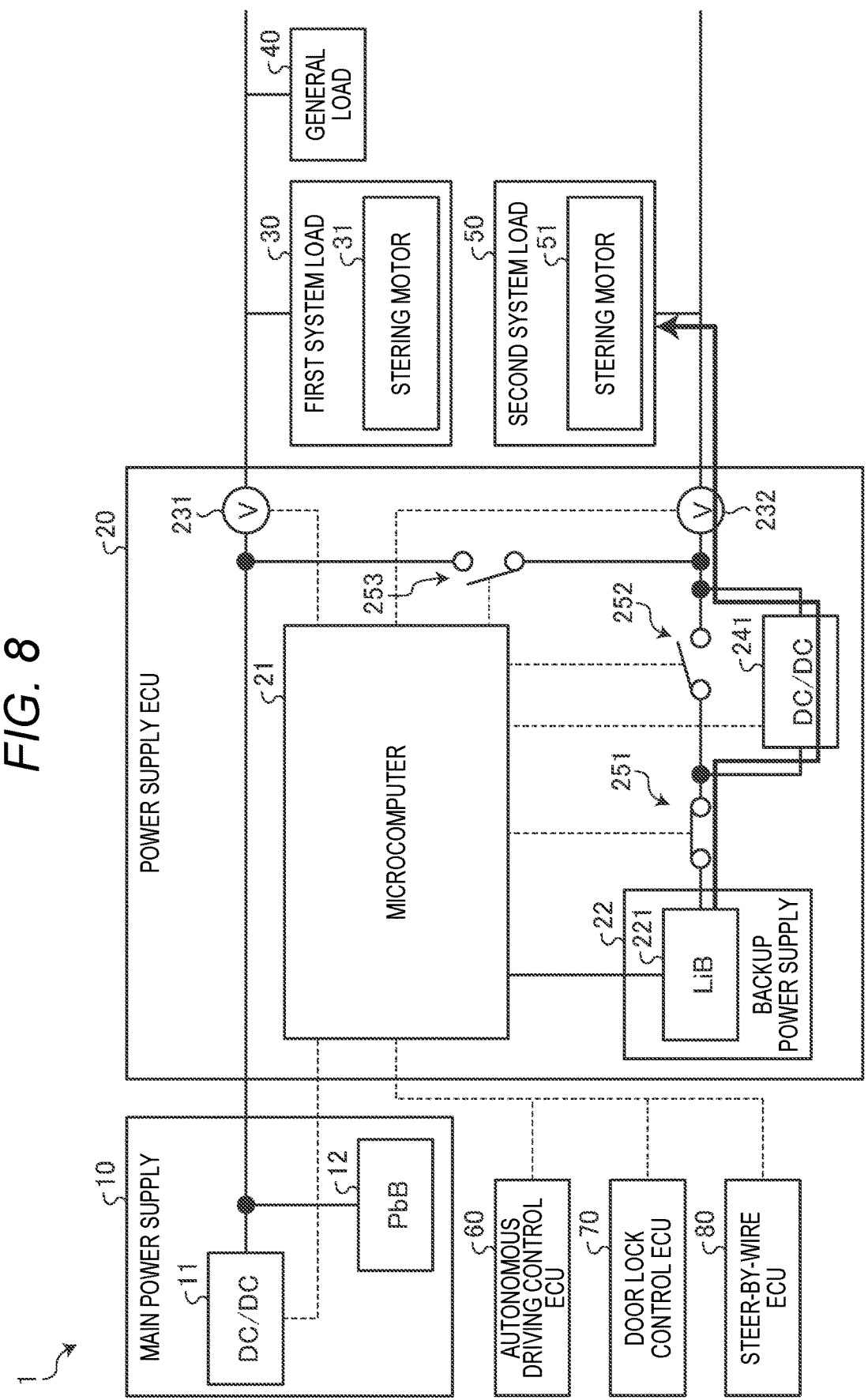
FIG. 8 is a diagram illustrating an operation example of the power supply control device according to the embodiment.

Subsequently, as illustrated in FIG. 8, in a state where the inter-system switch 253 is disconnected, the microcomputer 21 disconnects the bypass switch 252 to conduct the battery switch 251, controls the DC/DC 241, and supplies a current for the diagnosis from the backup power supply 22 to the second system load 50 via the DC/DC 241.

At this time, the microcomputer 21 adjusts the DC/DC 241 so as to flow a smaller amount of current than when the backup is actually performed. Accordingly, the microcomputer 21 can minimize a discharge amount of the backup power supply 22.

The microcomputer 21 calculates a cell resistance $R=\Delta V/\Delta I$ from a current $\Delta I$ and a voltage $\Delta V$ discharged from the backup power supply 22. At this time, the microcomputer 21 can obtain the current $\Delta I$ from a current sensor (not illustrated) provided in the second system 120 or the backup power supply 22, and obtain the voltage $\Delta V$ from the second voltage sensor 232.

When the calculated cell resistance value is less than the EOL cell resistance value at that time, the microcomputer 21 determines that the cell resistance does not deteriorate, and when the cell resistance value is equal to or larger than the EOL cell resistance value at that time, the microcomputer 21 determines that the cell resistance deteriorates.

At this time, when the previous capacity deterioration rate exceeds the EOL deterioration rate (for example, 80%), the microcomputer 21 determines that the capacity does not deteriorate, and when the previous capacity deterioration rate is equal to or smaller than the EOL deterioration rate, the microcomputer 21 determines that the capacity deteriorates.

The microcomputer 21 determines that the cell resistance is not deteriorated, determines that the capacity is not deteriorated, and diagnoses that the backup of the main power supply 10 by the backup power supply 22 is possible when the SOC exceeds the recharge threshold. In the diagnosis here, the deterioration of the capacity may not be considered.

Figure 9:
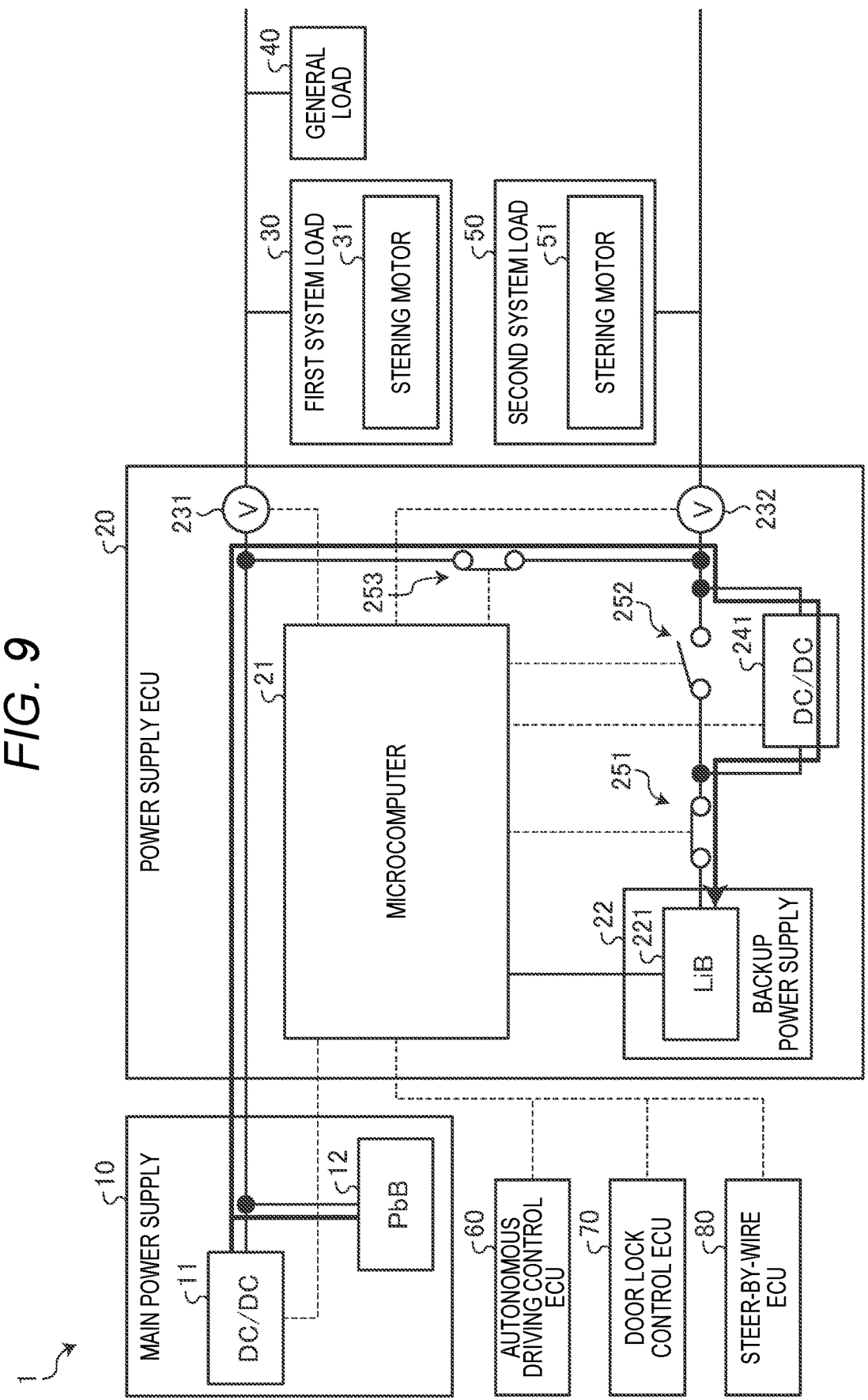
FIG. 9 is a diagram illustrating an operation example of the power supply control device according to the embodiment.

Thereafter, when the SOC of the backup power supply 22 is equal to or smaller than the recharge threshold, as illustrated in FIG. 9, the microcomputer 21 conducts the inter-system switch 253, and supplies electric power from the main power supply 10 to the backup power supply 22 via the DC/DC 241 to charge the backup power supply 22. The microcomputer 21 calculates the capacity deterioration rate of the backup power supply 22.

At this time, for example, the microcomputer 21 calculates the capacity deterioration rate based on the increase rate of the charge amount in the backup power supply 22 at the time of charging. The microcomputer 21 may calculate the capacity deterioration rate based on the SOC of the backup power supply 22 when the charging for a predetermined charging time required until the backup power supply 22 is fully charged is completed.

Here, the recharge threshold is set to a value larger than a lower limit of the SOC at which the backup of the main power supply 10 by the backup power supply 22 is possible. For example, as illustrated in FIG. 6, the recharge threshold is set to a value obtained by adding a sensor error/calculation error and a maximum discharge amount for 30 days to the backup allowable lower limit of the SOC.

Accordingly, if a period from when the IG is last turned off to when the IG is turned on next is within 30 days, the power supply ECU 20 can guarantee the SOC that can be backed up when the IG is turned on next.

When the calculated capacity deterioration rate exceeds the EOL deterioration rate (for example, 80%), the microcomputer 21 determines that the capacity does not deteriorate. When the calculated capacity deterioration rate is less than the EOL deterioration rate, the microcomputer 21 determines that the capacity deteriorates.

Here, the microcomputer 21 determines whether the cell resistance deteriorates based on the cell resistance value. In response to determining that the cell resistance does not deteriorate and that the capacity does not deteriorate, the microcomputer 21 diagnoses that the backup of the main power supply 10 by the backup power supply 22 is possible.

In the diagnosis here, deterioration of the cell resistance may be omitted from the determination material. As described above, the power supply ECU 20 can accurately diagnose whether the backup is possible by considering the deterioration of the cell resistance and the capacity deterioration rate which are determined each time at the time of startup.

Each time the IG is turned on, the power supply ECU 20 discharges the backup power supply 22 at a small amount, so that the SOC of the backup power supply 22 decreases to the recharge threshold value earlier than when the SOC is equal to or smaller than the recharge threshold value due to self-discharge.

Accordingly, since a cycle in which the backup power supply 22 is recharged, that is, a frequency at which the capacity deterioration rate of the backup power supply 22 is calculated, increases, the power supply ECU 20 may improve the reliability of a deterioration determination result of the capacity based on the capacity deterioration rate.

6. Flow of Process

Figure 10:
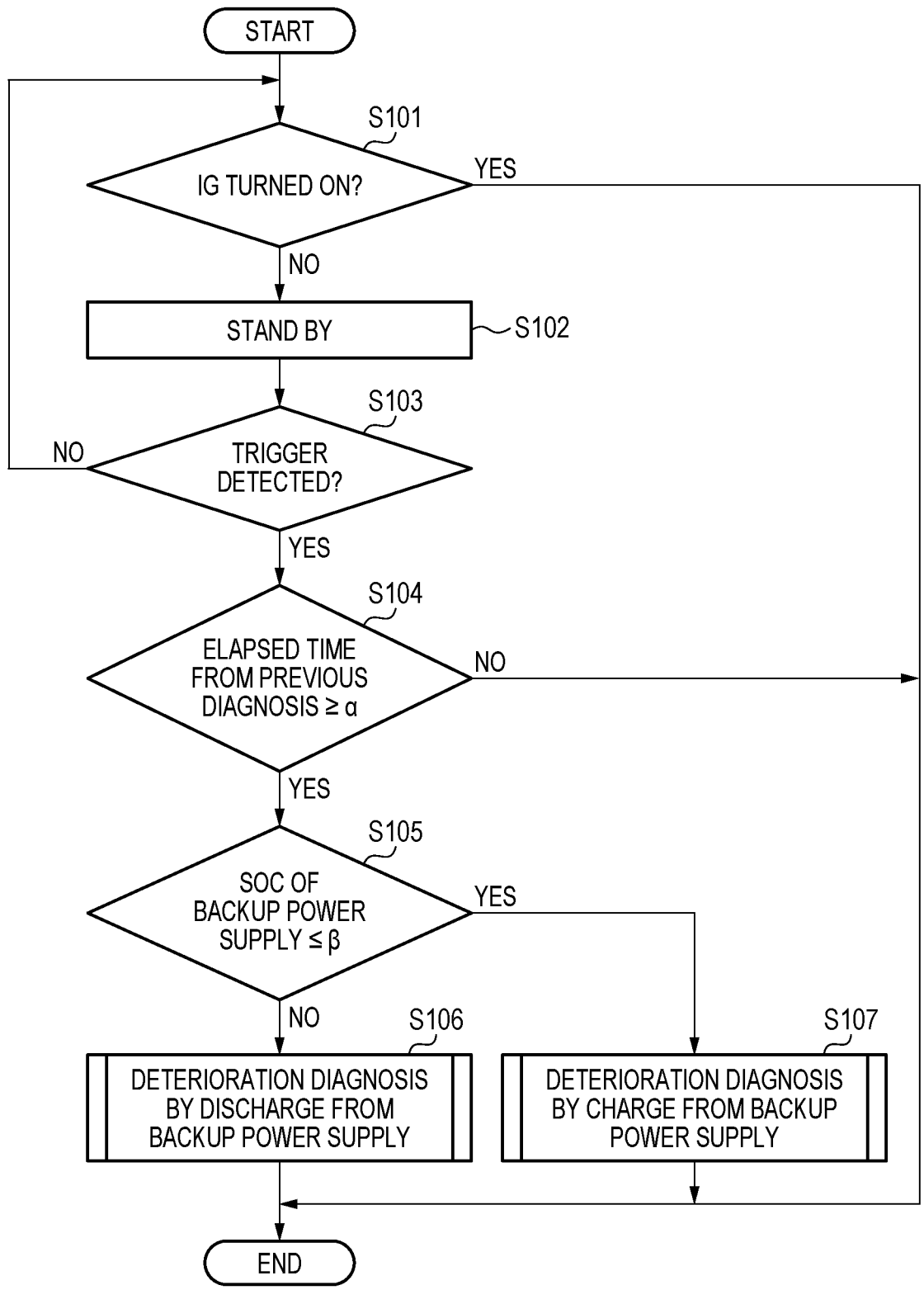
FIG. 10 is a flowchart illustrating an example of a process executed by the power supply control device according to the embodiment.

A flow of a process executed by the power supply control device (the power supply ECU 20) will be described with reference to FIG. 10. FIG. 10 is a flowchart illustrating an example of the process executed by the power supply control device according to the embodiment. In particular, FIG. 10 illustrates a process related to a diagnosis of the backup power supply 22 by the microcomputer 21. The power supply control ECU and the microcomputer 21 execute a process related to the power supply control of the vehicle, in addition to the process related to the diagnosis of the backup power supply 22.

As illustrated in FIG. 10, the microcomputer 21 stands by until the IG is turned on (step S101, No) (step S102). When the trigger is not detected during the standby (step S103, No), the microcomputer 21 returns to step S101 and continues to stand by until the IG is turned on.

When the IG is turned on (step S101, Yes), the microcomputer 21 ends the process related to the diagnosis. Thereafter, the microcomputer 21 proceeds to a process related to power supply control of the traveling vehicle.

When the microcomputer 21 detects a trigger during the standby (step S103, Yes), the process proceeds to step S104. For example, the trigger is that the user (key) has approached the vehicle, that the door lock has been unlocked, that it gets to a time a predetermined amount of time before the use reservation time, and that it gets to a time a predetermined amount of time before the getting-in time of the user predicted from the history.

That is, the microcomputer 21 detects the trigger before the IG is turned on, and proceeds to step S104 to start the diagnosis of the backup power supply 22.

When the elapsed time period from the previous diagnosis is equal to or longer than a threshold α (step S104, Yes), the microcomputer 21 proceeds to step S105 to continue the diagnosis. On the other hand, when the elapsed time period from the previous diagnosis is shorter than the threshold α (step S104, No), the microcomputer 21 ends the process. The threshold α is, for example, one week.

As described above, when the trigger is detected (step S103, Yes) and a time period elapsed since the last diagnosis is equal to or longer than a threshold (step S104, Yes), the microcomputer 21 starts a diagnosis before the user gets in the vehicle (step S105 and subsequent steps). Accordingly, it is possible to reliably diagnose deterioration of the backup power supply 22 and reduce the frequency of the diagnosis.

When the SOC of the backup power supply is larger than a threshold β (recharge threshold) (step S105, No), the microcomputer 21 performs a deterioration diagnosis by discharge from the backup power supply 22 (step S106). On the other hand, when the SOC of the backup power supply is equal to or smaller than the threshold β (a recharge threshold) (step S105, Yes), the microcomputer 21 performs a deterioration diagnosis by charge of the backup power supply 22 (step S107).

As illustrated in a portion after the time t41 in FIG. 6, the microcomputer 21 may perform the deterioration diagnosis by discharge and the deterioration diagnosis by charge in combination even when the deterioration diagnosis by charge is performed.

Figure 11:
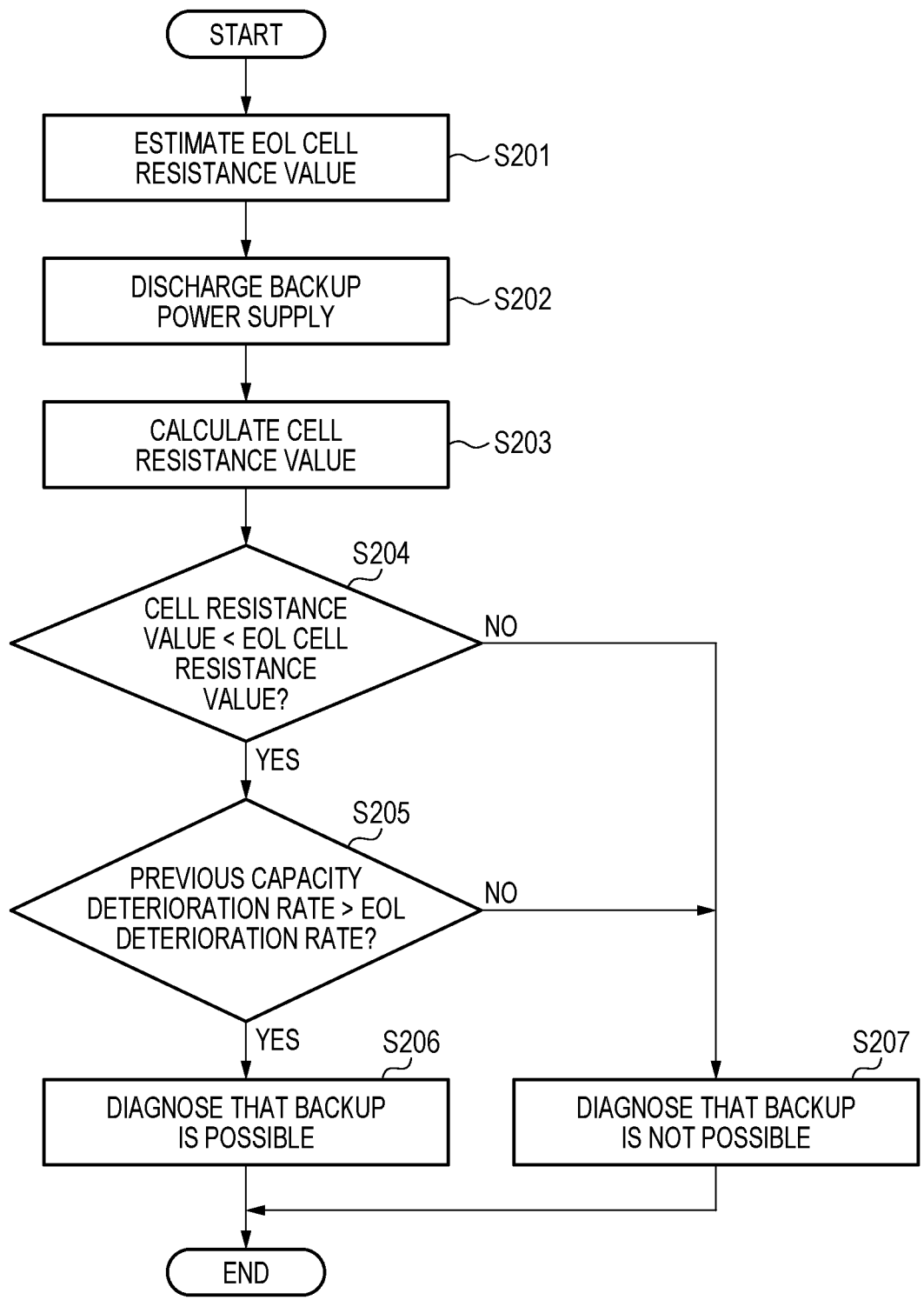
FIG. 11 is a flowchart illustrating an example of a deterioration diagnosis by discharge according to the embodiment.

With reference to FIG. 11, a flow of the deterioration diagnosis by discharge (step S106 in FIG. 10) will be described. FIG. 11 is a flowchart illustrating an example of the deterioration diagnosis by discharge according to the embodiment.

As illustrated in FIG. 11, the microcomputer 21 first estimates the EOL cell resistance value of the backup power supply 22 based on the SOC of the backup power supply, the temperature of the backup power supply 22, and the cell resistance value map (step S201).

Thereafter, the microcomputer 21 discharges the backup power supply 22 (step S202), and calculates the cell resistance value of the backup power supply 22 (step S203). The microcomputer 21 determines whether the cell resistance value of the backup power supply 22 is less than the EOL cell resistance value (step S204).

In response to determining that the cell resistance value of the backup power supply 22 is equal to or larger than the EOL cell resistance value (step S204, No), the microcomputer 21 determines that the cell resistance deteriorates. In this case, the microcomputer 21 diagnoses that the backup is not possible (step S207), and ends the process.

In response to determining that the cell resistance value of the backup power supply 22 is less than the EOL cell resistance value (step S204, Yes), the microcomputer 21 determines that the cell resistance does not deteriorate. In this case, the microcomputer 21 determines whether the previous capacity deterioration rate of the backup power supply 22 exceeds the EOL deterioration rate (step S205).

In response to determining that the previous capacity deterioration rate of the backup power supply 22 is equal to or smaller than the EOL deterioration rate (step S205, No), the microcomputer 21 determines that the capacity of the backup power supply 22 deteriorates. In this case, the microcomputer 21 diagnoses that the backup is not possible (step S207), and ends the process.

In response to determining that the previous capacity deterioration rate of the backup power supply 22 exceeds the EOL deterioration rate (step S205, Yes), the microcomputer 21 diagnoses that the backup is possible (step S206), and ends the process.

Figure 12:
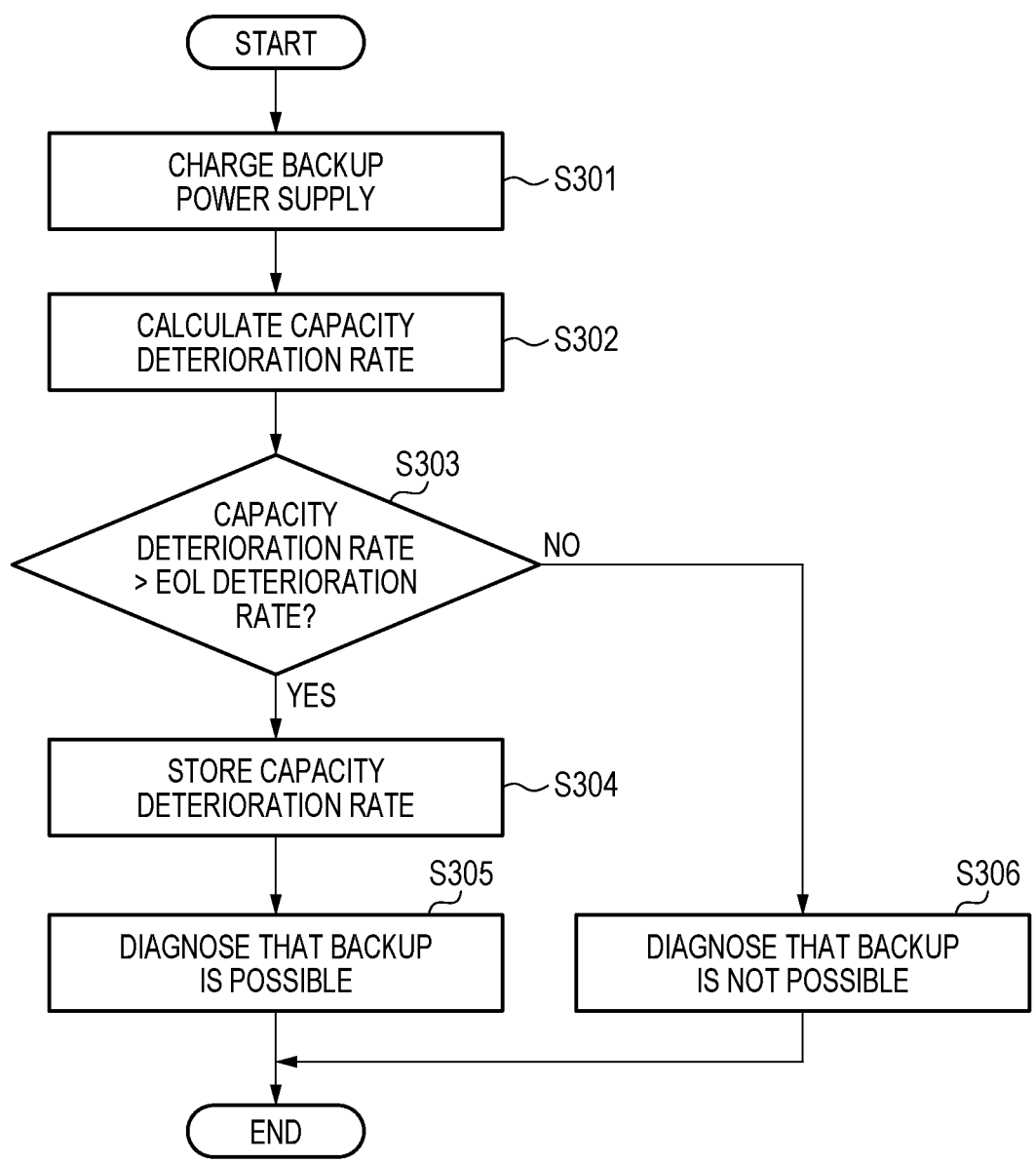
FIG. 12 is a flowchart illustrating an example of deterioration diagnosis by charge according to the embodiment.

With reference to FIG. 12, a flow of a deterioration diagnosis by charge (step S107 in FIG. 10) will be described. FIG. 12 is a flowchart illustrating an example of the deterioration diagnosis by charge according to the embodiment.

As illustrated in FIG. 12, first, the microcomputer 21 charges the backup power supply 22 (step S301), and calculates the capacity deterioration rate of the backup power supply 22 (step S302).

The microcomputer 21 determines whether the capacity deterioration rate exceeds an EOL capacity deterioration rate (step S303). In response to determining that the capacity deterioration rate is equal to or smaller than the EOL capacity deterioration rate (step S303, No), the microcomputer 21 determines that the capacity of the backup power supply 22 deteriorates. In this case, the microcomputer 21 diagnoses that the backup is not possible (step S306), and ends the process.

In response to determining that the capacity deterioration rate exceeds the EOL capacity deterioration rate (step S303, Yes), the microcomputer 21 determines that the capacity of the backup power supply 22 does not deteriorate, and stores the capacity deterioration rate as the previous capacity deterioration rate (step S304). In this case, the microcomputer 21 determines that the backup is possible (step S305), and ends the process.

The microcomputer 21 may be used in combination with a plurality of triggers described above. For example, the microcomputer 21 detects the trigger when the time is a time earlier by a predetermined amount of time than the use reservation time and the user has approached the vehicle within a certain range from the vehicle.

7. Appendix

As an appendix, the features of the present disclosure are illustrated below.

(1) A power supply control device including:
    a controller configured to perform a diagnosis of a degree of deterioration of a backup power supply that supplies electric power to a load of a vehicle when a main power supply that supplies electric power to the load fails, in which
    the controller is configured to start the diagnosis before the user gets in the vehicle, when detecting an occurrence of an event indicating that a user is to get in the vehicle.

(2) The power supply control device according to (1), in which
    the controller is configured to start the diagnosis, when detecting that the user has approached the vehicle within a certain range.

(3) The power supply control device according to (2), in which
    the controller is configured to detect that the user has approached the vehicle within a certain range, when a distance between a key for unlocking a door of the vehicle and the vehicle is less than a threshold. (4)

The power supply control device according to any one of (1) to (3), in which
the controller is configured to start the diagnosis, when detecting that a door of the vehicle is unlocked.
(5) The power supply control device according to any one of (1) to (4), in which
the controller is configured to obtain a use reservation time of the vehicle by the user, and start the diagnosis when detecting that it reaches a time earlier by a predetermined amount of time than the use reservation time.
(6) The power supply control device according to any one of (1) to (5), in which
the controller is configured to start the diagnosis, when detecting that it reaches a time earlier by a predetermined amount of time than a prediction time at which the user starts driving the vehicle, the prediction time being predicted based on a history of a time at which the user starts driving the vehicle.
(7) The power supply control device according to any one of (1) to (6), in which
the controller is configured to perform the diagnosis by charging the backup power supply, when a SOC of the backup power supply is equal to or smaller than a threshold.
(8) The power supply control device according to any one of (1) to (7), in which
the controller is configured to start the diagnosis before the user gets in the vehicle, when an occurrence of an event indicating that the user is to get in the vehicle is detected and a time period elapsed since the last diagnosis is equal to or longer than a threshold.
(9) A power supply control method performed by a controller, including
diagnosing a degree of deterioration for a backup power supply that supplies electric power to a load of a vehicle, when a main power supply that supplies electric power to the load fails, and
the power supply control method further including
starting the diagnosis before the user gets in the vehicle, when an occurrence of an event indicating that a user is to get in the vehicle is detected.
(10) A non-transitory computer-readable storage medium storing a power supply control program that causes a controller to perform a process, the process including
diagnosing a degree of deterioration for a backup power supply that supplies electric power to a load of a vehicle when a main power supply that supplies electric power to the load fails, and
the process further including
starting the diagnosis before the user gets in the vehicle, when an occurrence of an event indicating that a user is to get in the vehicle is detected.

Further effects and modifications can be easily derived by those skilled in the art. Therefore, broader aspects of the present disclosure are not limited to the specific details and representative embodiments illustrated and described above. Therefore, various modifications may be made without departing from the spirit or scope of the general inventive concept as defined by the appended claims and equivalents thereof.

The invention claimed is:
1. A power supply control device comprising:
a controller configured to perform a diagnosis of a degree of deterioration of a backup power supply that supplies electric power to a load of a vehicle when a main power supply that supplies electric power to the load fails, wherein
the controller is configured to start the diagnosis before a user gets in the vehicle, when detecting an occurrence of an event indicating that the user is to get in the vehicle.
2. The power supply control device according to claim 1, wherein
the controller is configured to start the diagnosis, when detecting that the user has approached the vehicle within a certain range.
3. The power supply control device according to claim 2, wherein
the controller is configured to detect that the user has approached the vehicle within a certain range, when a distance between a key for unlocking a door of the vehicle and the vehicle is less than a threshold.
4. The power supply control device according to claim 1, wherein
the controller is configured to start the diagnosis, when detecting that a door of the vehicle is unlocked.
5. The power supply control device according to claim 1, wherein
the controller is configured to obtain a use reservation time of the vehicle by the user, and start the diagnosis, when detecting that it gets to a time earlier by a predetermined amount of time than the use reservation time.
6. The power supply control device according to claim 1, wherein
the controller is configured to start the diagnosis, when detecting that it gets to a time earlier by a predetermined amount of time than a prediction time at which the user starts driving the vehicle, the prediction time being predicted based on a history of a time at which the user starts driving the vehicle.
7. The power supply control device according to claim 1, wherein
the controller is configured to perform the diagnosis by charging the backup power supply, when a SOC of the backup power supply is equal to or smaller than a threshold.
8. The power supply control device according to claim 1, wherein
the controller is configured to start the diagnosis before the user gets in the vehicle, when an occurrence of an event indicating that the user is to get in the vehicle is detected and a time period elapsed since the last time of the diagnosis is equal to or longer than a threshold.
9. A power supply control method performed by a controller, comprising
diagnosing a degree of deterioration for a backup power supply that supplies electric power to a load of a vehicle, when a main power supply that supplies electric power to the load fails, and
the power supply control method further comprising
starting the diagnosis before the user gets in the vehicle, when an occurrence of an event indicating that a user is to get in the vehicle is detected.
10. A non-transitory computer-readable storage medium storing a power supply control program that causes a controller to perform a process, the process comprising
diagnosing a degree of deterioration for a backup power supply that supplies electric power to a load of a vehicle when a main power supply that supplies electric power to the load fails, and the process further comprising
starting the diagnosis before the user gets in the vehicle, when an occurrence of an event indicating that a user is to get in the vehicle is detected.

* * * * *